United States Patent

[15] 3,660,041

Moore et al.

[45] May 2, 1972

[54] BURNER-FLAME ARRESTER FOR BURNING OFF-GAS FROM A BOILING WATER REACTOR POWER PLANT

[72] Inventors: George E. Moore, Scotia; Lee H. Tomlinson, Schenectady, both of N.Y.

[73] Assignee: General Electric Company

[22] Filed: Oct. 29, 1968

[21] Appl. No.: 771,467

[52] U.S. Cl. ..................23/262, 23/2 C, 23/204 C, 23/277 C, 176/37, 176/39, 431/328, 48/192
[51] Int. Cl. ..................B01j 1/14, F23d 13/16, G21f 9/02
[58] Field of Search ..................23/288.91, 262, 277 C, 281, 23/257, 288; 176/37, 38, 39; 252/476, 477; 48/192; 431/328

[56] References Cited

UNITED STATES PATENTS 3,296,083   1/1967   Haake et al. ..................176/54

Primary Examiner—James H. Tayman, Jr.
Attorney—Richard R. Brainard, Paul A. Frank, Charles T. Watts, Leo I. MaLossi, Melvin M. Goldenberg and Frank L. Neuhauser

[57] ABSTRACT

A cooled porous plug device in combination with a continuous ignition source is used for burning off explosive mixtures of contaminated radiolytic hydrogen-oxygen gas flow discharged from the steam turbine cycle of a boiling water nuclear power reactor. Optional use of a second cooled porous plug is shown, the second porous plug being located downstream of the burner to function as a heat exchanger to cool the combustion products for controlled condensation of the water vapor.

5 Claims, 4 Drawing Figures

Inventors:
George E. Moore,
Lee H. Tomlinson,
by
Their Attorney.

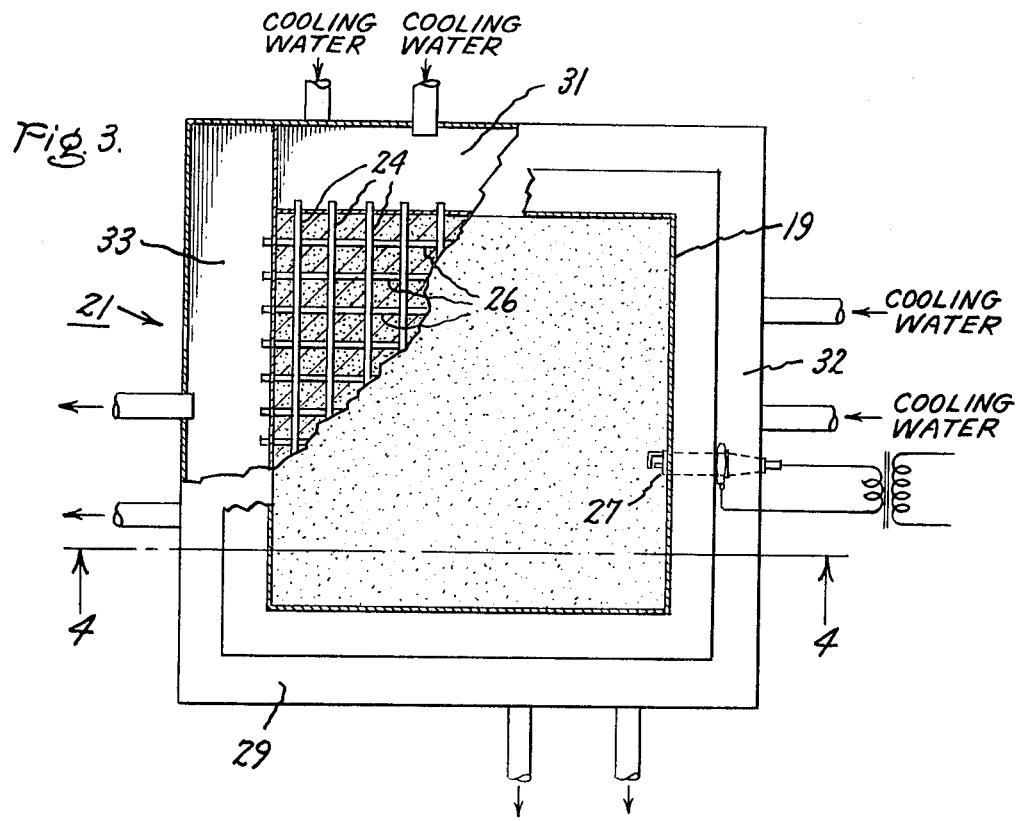
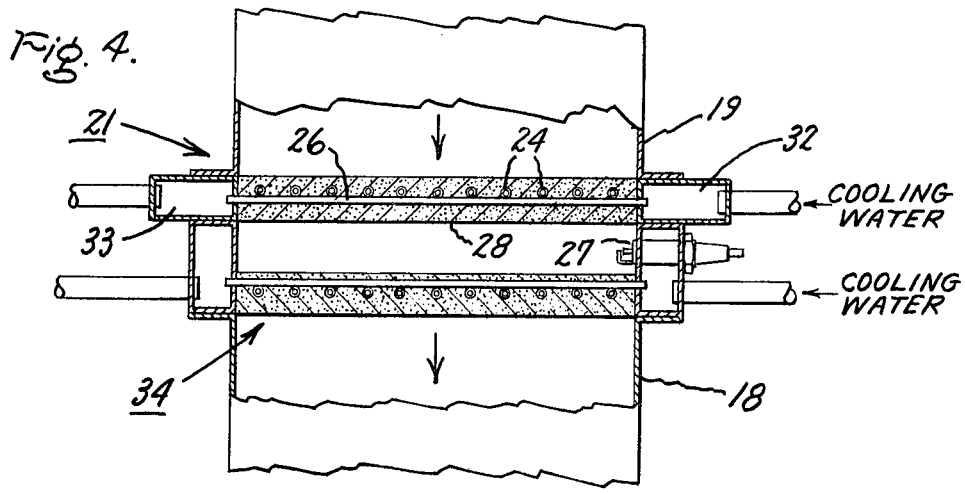

BURNER-FLAME ARRESTER FOR BURNING OFF-GAS FROM A BOILING WATER REACTOR POWER PLANT

BACKGROUND OF THE INVENTION

In the production of high pressure steam in a boiling water reactor power plant a small percentage (about 0.007%) of the water traversing the radiation field is decomposed thereby (radiolysis) generating stoichiometric ($2H_2 + O_2$) quantities of hydrogen and oxygen gases. This gas content passes through the power-generating turbines along with the steam. The hydrogen and oxygen gases are removed from the water in the main condenser along with air, which has leaked into the low pressure turbine, and very small quantities of radioactive isotopes of xenon and krypton picked up by the main steam flow in the reactor core in some manner.

The volume of off-gas generated is typically about 0.06 cubic feet/minute/thermal Megawatt (or about 0.2 cubic feet/minute/Megawatt electrical. Although the amounts (about $10^{-6}$% by volume) of radioactive isotopes of $Xe$ and $Kr$ are minute, they account for almost all of the radioactivity (about 300 curies/ft$^3$) of the off-gas flow. The presence of these radioactive contaminants necessitates the retention of the off-gas for about 30 minutes to permit the decay of these fission products before release to the environment. Thus, because of the presence of very small amounts of radioactive contaminants, very large explosive, easily ignited volumes of off-gas have had to be held for this decay period.

The practice has been to provide the requisite residence time in a large volume piping system designed to withstand explosions. As an example, such a holdup pipe can be a few feet in diameter and extend for several hundred feet. Because of the necessity for both explosion-proof design and large volume, such construction is costly and the removal of this hazard and its consequent expense would be very desirable.

It has already been suggested that this problem might be greatly relieved by recombining the stoichiometric hydrogen-oxygen content of the off-gas to form water, condense it and thereby a) greatly reduce the volume of gas requiring the holding treatment and b) remove the risk of explosion in the off-gas system. Fear of detonating the off-gas has strictly limited the art to non-flammable means for effecting this recombination and catalytic recombiners have, in fact, been used. However, such recombiners have the serious disadvantages of requiring a) steam dilution of the hydrogen content to a concentration of about 4% by volume, b) superheating of the steam diluted mixture to prevent catalyst poisoning and c) periodic catalyst replacement, because of the cumulative poisoning thereof by water and/or organic materials.

The art is, therefore, in need of a thoroughly reliable, relatively maintenance-free device for inexpensively recombining continuous or intermittent flows of mixed hydrogen/oxygen gases of variable, uncontrollable velocity in a completely safe manner obviating the need for large volume explosion-proof off-gas hold-up pipes and, as well, eliminating still another area of risk.

SUMMARY OF THE INVENTION

Although the use of flame combustion for recombination of the hydrogen-oxygen gas mixture previously has been considered dangerous, it has been found that with the device of this invention flame combustion can be safely and reliably employed. This device consists of a cooled porous plug burner in combination with a continuous ignition source and, if desired, one or more additional porous plug units in series therewith.

BRIEF DESCRIPTION OF THE DRAWING

The next nature of this invention as well as other objects and advantages thereof will be readily apparent from consideration of the following specification relating to the annexed drawing in which:

FIG. 3 is an elevational view of one configuration of the improved burner-flame arrester of this invention with a portion thereof cut away to show the cooling system, and FIG. 4 is a sectional view taken on line 4—4 of FIG. 3.

DESCRIPTION OF THE PREFERRED EMBODIMENT

Figure 1:
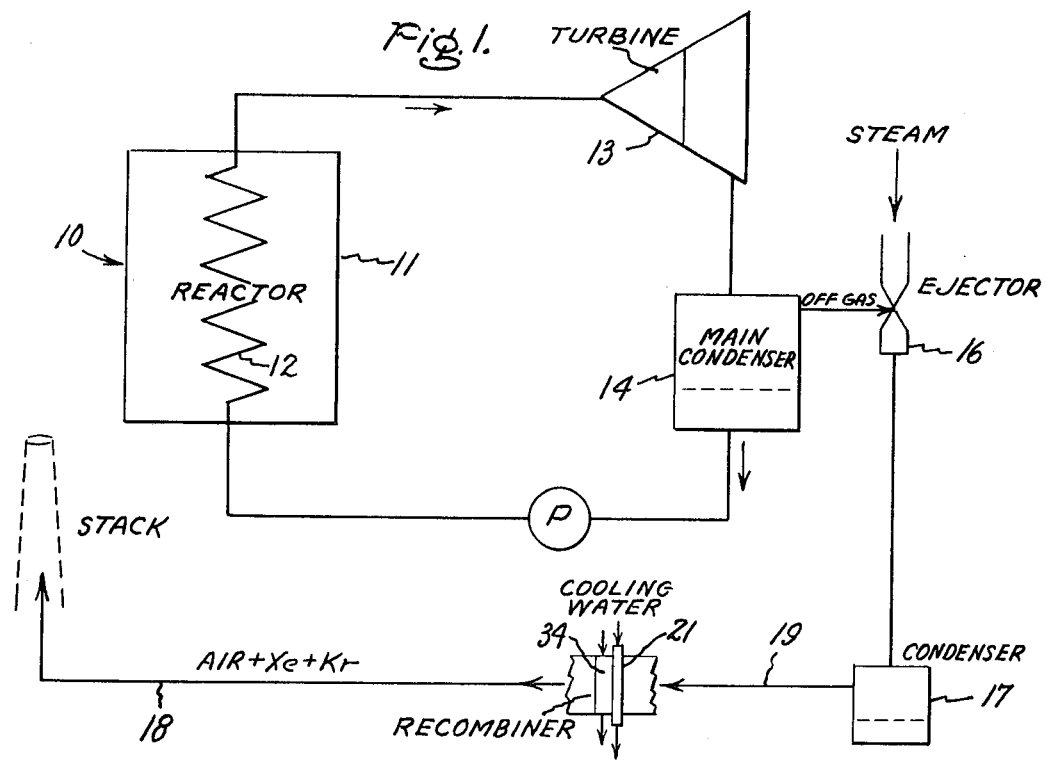
FIG. 1 is a schematic representation relating the instant invention to the environment of its application.

Referring now to the schematic representation of the boiling water reactor power plant 10 shown in FIG. 1, water passing through reactor core 11 in conduit 12 is converted to steam. Thereafter, the steam so generated is passed through steam turbine 13. After the low pressure stage of turbine 13 has been traversed, the steam (now at low pressure) passes through main condenser 14 at which point the gas content thereof is removed via the steam jet air ejector 16. Ejector 16 pumps the off-gas up to atmospheric pressure, or slightly above atmospheric pressure. The off-gas then passes to condenser 17, where the pumping steam used in operation of ejector 16 is condensed. From this point the off-gas is an explosive mixture.

The dry composition of this off-gas would typically be 60% $H_2$; 30% $O_2$; 10% air plus about $10^{-6}$% radioactive gaseous isotopes. The volume flow of this gas varies in proportion to the reactor output, so that when the power load is low, much less off-gas is produced than at full load, although air inleakage in the low pressure stages of the turbine tends to be constant. Typically, the volume flow of off-gas for an 1,100 Megawatt electrical (MWe) boiling water reactor may be as high as 300 standard cubic feet/minute having the proportions set forth above. Thus, by the practice of this invention whereby the hydrogen and oxygen can be safely recombined to form water, about 90% of the off-gas flow volume can be eliminated enabling a great reduction in the size of the off-gas holding system (pipe 18) and, equally important, eliminating the expense of explosion-proof design for the off-gas system.

In the instant invention the off-gas flow from condenser 17 is passed through pipe 19 to the cooled porous plug burner 21, where the explosive hydrogen/oxygen mixture is burned in a stable flame as rapidly as it enters the ignition region (FIG. 4) and, at the same time, functions as a flame arrester reliably preventing the propagation of flame upstream into the explosive mixture in pipe 19.

Figure 2:
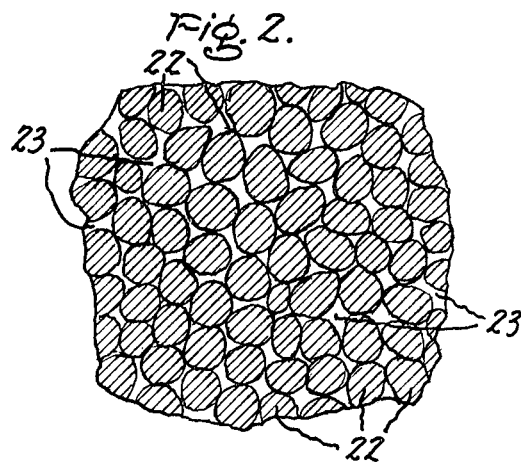
FIG. 2 is a magnified view of a portion of the interior of a porous plug burner such as would be used in the practice of this invention.

The porous plug burner 21 is made of sintered metal, preferably copper particles in the size range from about 1 to about 200 microns. The illustration in FIG. 2 shows the general relationship of the sintered metal particles 22 and interconnected voids 23 permitting continuous passage of the off-gas mixture through the porous body of burner 21 with a pressure drop of less than 1 psi for a burner body about five-eighths inch thick. The pressure drop will vary as a function of the velocity of the off-gas flow. For plug burners about one-half inch thick the pressure drop is about 0.03 psi/cm/sec of gas flowing under a pressure of about 1 atmosphere.

Porous plug units such as described in FIGS. 2, 3 and 4 have been produced from oxygen-free copper particles with copper cooling tubes 24, 26 embedded therein in a graphite mold by sintering the particles during the application of a small pressure (less than about 2 psi) thereto. The extent of pressure application determines the void content and, therefore, the strength of the porous body. The most important aspect of void content control is, however, the attainment of a low flow resistance and a high thermal conductivity of the body. The arrangement of cooling tubes 24, 26 shown in FIG. 3 also provides excellent reinforcement for the porous sintered material.

In operation the off-gas leaving condenser 17 is explosive and by the time it has reach burner 21 is thoroughly pre-mixed and homogeneous. It passes through voids 23 of porous plug burner 21 and is ignited by spark igniter 27, which should be continuously operated from some energy source. Ignition occurs at this time and the flame recedes to within about a millimeter of the surface 28 spreading flat thereover against the uniform flow issuing from porous body 21.

A temperature gradient then becomes established in porous body 21 (depending upon the unburned flow velocity) so that heat generated from the recombination combustion is rejected to the interior of body 21, where it is efficiently removed by coolant, e.g. water, circulating through cooling tubes 24, 26 via manifolds 29, 31 and 32, 33, respectively.

Burner 21 will operate maintaining a steady flame indefinitely even with the temperature of surface 22 being only a few degrees above ambient. Because such a large fraction of the heat of combustion is continuously absorbed by the cooling system, the burner 21 is subjected to a very large heat flux, which may continuously exceed 25 calories/cm$^2$-sec. The total recombination heat rate for a 1,000 MWe plant would be about 700 Kw. Voids 23 have an effective pore size which is smaller than the quenching distance for even the most energetic common explosive mixtures and for this reason the construction of porous plug burner 21 insures the absence of flashback.

At velocities of less than about 10 centimeters/second, the high conductivity of the porous copper together with the capacity of the cooling system produces condensation of water (the product of the recombined hydrogen/oxygen mixture) either on surface 28 or in voids 23 close to surface 28 over part of the surface area. The extent to which this condensation will cover surface 28 depends upon the velocity of the off-gas. That is, with a condition of low gas velocity upstream of burner 21 sufficient of the surface 28 automatically becomes condensation area to temporarily restrict the exit area through surface 28 to a size regulating the exit velocity of the off-gas therethrough to a value sufficiently high to maintain the necessary heat flux to assure a region of combustion at surface 28, which will be free of condensation. It is this very self-regulating feature, which helps the porous plug burner to accommodate extremely wide ranges of gas flow and provide the reliability so vital to the instant application.

As an indication of the capabilities in service of the instant invention, a 9-inch square burner-arrester assembly was prepared with a porous copper body about ½ inch thick in which was embedded 18 — one-eighth inch diameter tubes (24) and 18 — one-eighth inch diameter tubes (26). This unit was operated as a burner for over 2,000 hours in an accelerated life test at a heat flex of about 22 calories/cm$^2$-sec (a heat flux comparable to heat flux encountered in a rocket engine) burning 22 cubic feet per minute of undiluted ($2H_2 + )_2$) and interposing more than 70 cycles variation from shutdown to full load. At the end of the test, the burner unit was discolored from oxide formation but was still functionally and structurally sound. The flow resistance of the porous material had increased a slight amount, but still remained considerably below 1 psi at 1 atmosphere off-gas pressure.

It is of advantage, of course, in the application illustrated herein to condense all of the $H_2O$ formed from the combustion process and, for this purpose, a manifolded sintered porous copper unit 34 similar to burner 21 may be employed. Preferably condenser 34 would be made using coarser metal particles to reduce even more the pressure loss therethrough. Other suitably designed heat exchangers may be used for cooling the combustion products and condensing the water although condenser unit 34 functions very effectively for this purpose. No combustion, of course, occurs at condenser unit 34.

The off-gas flow leaving condenser 34 (amounting to about 10 per cent of the volume upstream in pipe 19) would then be conducted to underground pipe 18 for holding therein for the requisite decay time. If a stack is already available as, for example, for the discharge of ventilation air, the de-activated off-gas flow would advantageously be released through such a stack. However, the deactivated off-gas may be released at, or near, ground level.

By the use of the invention described herein, the storage, or hold volume for the de-activation of the gaseous radioactive isotopes may be very greatly reduced in volume and the cost of this facility will be further drastically reduced, because of the removal of the treat of explosion.

Although the specific burner configuration described herein is preferred, the porous plug body may be made in shapes other than as a flat plate, e.g. as cylinders, cones, etc. Also, if desired, the construction may be safely modified by employing only one set of cooling tubes substituting solid rods for the second set. The heated coolant from burner 21 will take away about 700 Kw of heat flow in a 1,000 MWe boiling water reactor, which heat may be recovered, at least in part, by conventional heat exchange devices.

As an approximate rule of design about 0.8 in$^2$ of burner surface (i.e. surface 28) should be provided per MWe output of the power plant. This design approximation is conservative, however, since burners so designed can accommodate (for short periods, at least) gas velocities and heat fluxes about twice as large as those assumed in arriving at this design value.

Although copper is the preferred material for preparation of the body of the porous burner other metals, as for example silver, may be employed so long as the burner unit so prepared will have sufficiently high thermal conductivity to accommodate the heat fluxes encountered.

What we claim as new and desire to secure by Letters Patent of the United States is:

1. In a boiling water reactor power plant in which nuclear fission is utilized for the generation of heat in the reactor core; the heat so generated is used to convert water to steam within a first flow path which extends into and back out of said reactor core; said first flow path is in flow communication with the high pressure stage of a steam turbine; the low pressure stage of said turbine is in flow communication via a second flow path with a condenser wherein the steam is condensed for return to said first flow path and at the same time the gas content of the steam comprising a stoichiometric mixture of hydrogen and oxygen is removed from the circuit via a third flow path; said third flow path is in flow communication with means for recombining the hydrogen/oxygen mixture to form water, the improvement wherein the recombining means comprises:

a. a sintered metal porous plug burner body having first and second major surfaces on opposite sides thereof, the third flow path being in flow communication with said first major surface,
   b. means for circulating cooling fluid within said body of said porous plug burner and
   c. means located downstream of and adjacent said second major surface for igniting the flow of hydrogen/oxygen mixture after passage thereof through said body of said porous plug burner whereby all hydrogen/oxygen mixture reaching said second major surface is burned.

2. The improvement as recited in claim 1 wherein the porous body of the burner is of sintered copper particles.

3. The improvement as recited in claim 1 wherein the circulating means includes a plurality of parallel tubes connected into spaced manifolds extending along opposite sides of the body of the porous burner.

4. The improvement as recited in claim 1 wherein the ignition means includes a continuously operable spark gap.

5. The improvement as recited in claim 1 wherein heat exchange means are located downstream of the porous plug burner to condense water vapor produced during combustion at said porous plug burner.

* * * * *